United States Patent
Dunbar et al.

(10) Patent No.: US 6,592,190 B2
(45) Date of Patent: Jul. 15, 2003

(54) SECONDARY BRAKE SYSTEM WITH ELECTROHYDRAULIC PROPORTIONAL VALVE

(75) Inventors: Scott David Dunbar, Cedar Falls, IA (US); William Guy Alexander, Waterloo, IA (US); Steven Daniel Wallestad, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/903,167

(22) Filed: Jul. 11, 2001

(65) Prior Publication Data

US 2003/0011240 A1 Jan. 16, 2003

(51) Int. Cl.[7] ............................................. B60T 13/00
(52) U.S. Cl. .......................................... 303/9.61; 303/7
(58) Field of Search ........................ 303/6.01, 9–9.74; 188/345, 349

(56) References Cited

U.S. PATENT DOCUMENTS

| | | |
|---|---|---|
| 1,822,714 A | 8/1931 | Tatter |
| 2,616,658 A | 11/1952 | Dombeck ................... 251/118 |
| 3,339,986 A | 9/1967 | Lowin et al. .................. 303/7 |
| 3,466,096 A | 9/1969 | Cunningham ................. 303/6 |
| 3,863,991 A | 2/1975 | Wilson ........................... 303/6 |
| 3,901,556 A | 8/1975 | Prillinger et al. ............. 303/13 |
| 3,982,792 A | 9/1976 | Nakajima ...................... 303/6 |
| 4,475,773 A | 10/1984 | Bartscher et al. .............. 303/6 |
| 4,505,519 A | 3/1985 | Muterel ......................... 303/6 |
| 4,632,466 A | * 12/1986 | Grauel et al. .................. 303/7 |
| 4,898,078 A | * 2/1990 | Gage et al. ................ 303/9.61 |
| 5,222,787 A | * 6/1993 | Eddy et al. ................ 303/9.62 |
| 5,971,499 A | 10/1999 | Pape et al. ................. 303/9.61 |
| 6,072,877 A | 6/2000 | Abel ............................ 381/17 |

* cited by examiner

Primary Examiner—Christopher P. Schwartz

(57) ABSTRACT

A vehicle brake system includes a primary hydraulic pump, a secondary variable delivery pump, left and right service brakes and left and right secondary brakes. A service brake valve is connected between the primary pump and the service brakes, and operates the service brakes in response to brake pedal operation. Left and right service brake switches generate signals representing operational status of the service brakes. An electrohydraulic secondary brake valve operates the secondary brakes in response to an electronic control signal. Brake pressure sensors generate brake pressure signals representing the service brake pressure and the secondary brake pressure. An electronic control unit is coupled to the service brake switches, to the pressure sensors and to the secondary brake valve. The control unit generates the control signal as a function of the status of the service brakes and of the brake pressure signals.

4 Claims, 1 Drawing Sheet

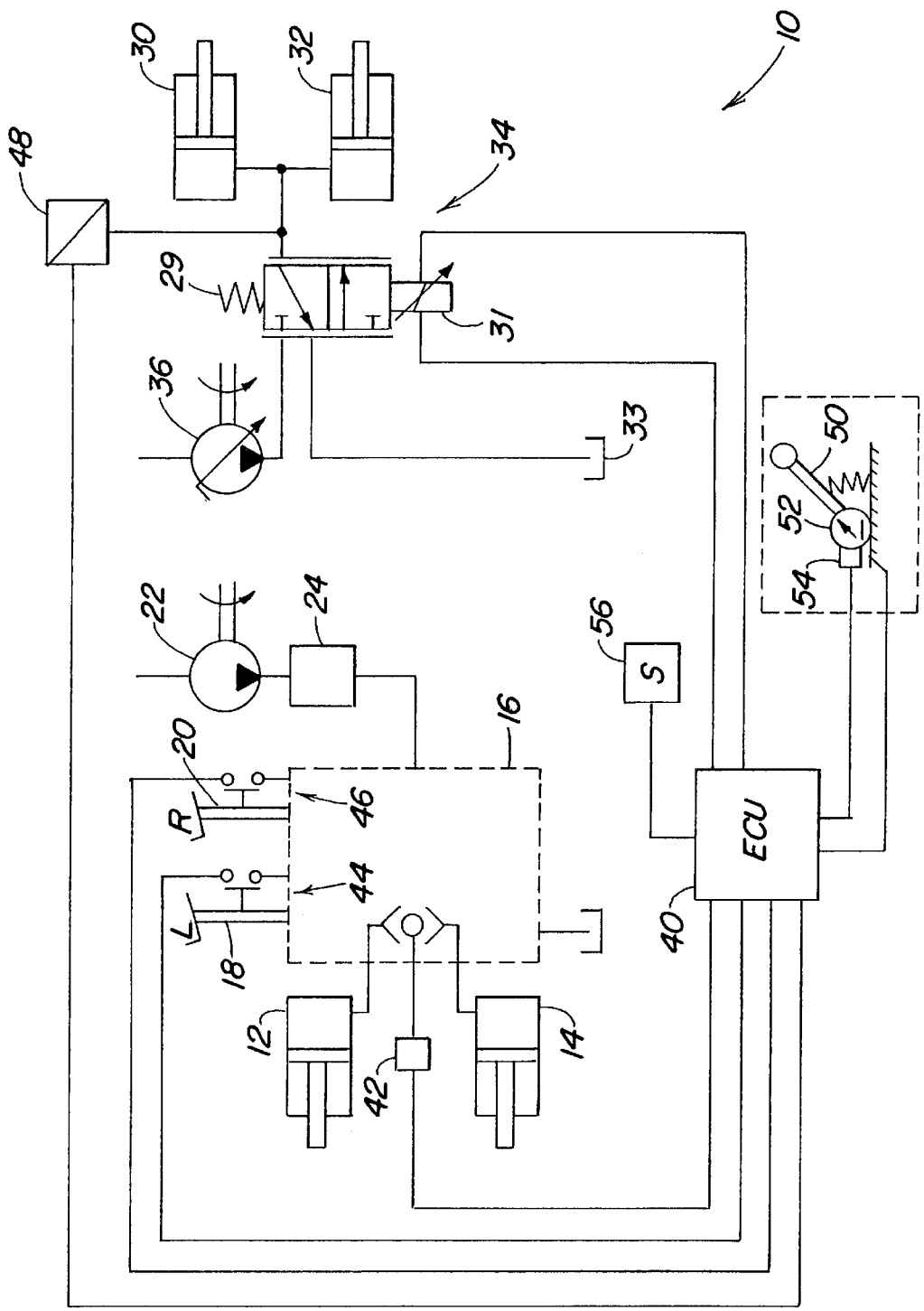

SECONDARY BRAKE SYSTEM WITH ELECTROHYDRAULIC PROPORTIONAL VALVE

BACKGROUND OF THE INVENTION

The invention relates to a vehicle brake system, and more particularly, to a brake system with an electro-hydraulic secondary brake system.

Certain jurisdictions, such as Europe, have regulations which require off-road vehicles, such as tractors, to have a secondary brake system to help stop the tractor when the tractor is being operated at higher speeds. All tractors sold in Europe have service brakes which operate on the rear axle and which are controlled by independent foot pedals. A hand-operated lever is typically used to actuate the secondary brake system (the front brakes), But, such systems do not actuate the secondary brakes when both service brake pedals are simultaneously depressed in order to assist in stopping the tractor, and such systems do not vary the application of the secondary brakes as a function of brake pressure.

SUMMARY

Accordingly, an object of this invention is to provide a brake system which includes an electrohydraulic secondary brake control valve and an electronic control unit which cooperate to actuate secondary brakes when both service brake pedals are simultaneously depressed in order to assist in stopping the tractor.

Another object of this invention is to provide such a brake system which controls the application of the secondary brakes as a function of brake pressure.

These and other objects are achieved by the present invention, wherein a vehicle brake system includes a primary hydraulic pump, a secondary variable delivery pump, left and right service brakes and left and right secondary brakes. A service brake valve is connected between the primary pump and the service brakes, and operates the service brakes in response to brake pedal operation. Left and right service brake switches generate signals representing operational status of the service brakes. An electrohydraulic secondary brake valve operates the secondary brakes in response to an electronic control signal. Brake pressure sensors generate brake pressure signals representing the service brake pressure and the secondary brake pressure. An electronic control unit is coupled to the service brake switches, to the pressure sensors and to the secondary brake valve. The control unit generates the control signal as a function of the status of the service brakes and of the brake pressure signals. When both service brakes are applied, and the service brake pressure is at a certain level, the control unit causes the secondary brake valve to operate the secondary brakes.

BRIEF DESCRIPTION OF THE DRAWINGS

The sole FIGURE is a schematic diagram of a brake system according to the present invention.

DETAILED DESCRIPTION

Referring to the sole FIGURE, a brake system 10 includes left and right rear or service brakes 12, 14 controlled by a service brake valve 16 in response to left and right service brake pedals 18,20. Valve 16 receives pressurized hydraulic fluid from an engine driven primary hydraulic pump 22 via a priority valve 24.

Left and right front or secondary brakes 30, 32 are controlled by a solenoid operated electrohydraulic, normally closed proportional pressure reducing valve 34 which receives pressurized fluid from a secondary variable delivery pump 36, and which is controlled by electronic control unit ECU 40. A spring 29 moves the secondary brake valve 34 to a closed position wherein communication between pump 36 and secondary brakes 30, 32 is blocked and wherein the secondary brakes 30, 32 are communicated directly to a sump 33 when the solenoid 31 is deenergized. The secondary brake valve 34 communicates the secondary brakes 30, 32 directly to secondary pump 36 when the solenoid 31 is energized.

A rear brake pressure sensor 42 provides a rear brake pressure signal to the ECU 40. Left and right normally open service brake switches 44, 46 close upon actuation of the brake pedals 18, 20, are connected to the ECU 40 and provide the ECU 40 with signals representing the status of the service brakes 18, 20. A front brake pressure sensor 48 provides the ECU 40 with a front or secondary brake pressure signal as a feedback signal for closed loop control of the secondary brake 30, 32.

Optionally, a hand operated lever 50 may be provided to operate the secondary brakes independently of the primary brakes. A non-contact lever position sensor 52 communicates a lever position signal to the ECU 40. A switch unit 54, such as a single pole, double throw switch unit, is coupled to the brake lever 50 and provides lever engaged/disengaged status signals to the ECU 40. Switch unit 54 includes an engaged switch (not shown) which closes when lever 50 is raised and a disengaged switch (not shown) which opens when lever 50 is raised. The ECU 40 also receives a vehicle speed signal from a speed sensor 56.

The ECU 40 receives the above-mentioned inputs and, in response thereto, provides control valve 34 with a pulse-width-modulated, temperature and voltage compensated solenoid control current with a lever current component (a current associated with lever 50) and with a pressure current component. Under normal conditions, the ECU 40 controls current to the front brake solenoid valve 34 in proportion to the height of the brake lever 50 and front brake pressure from sensor 48. As the height of lever 50 increases, the lever current component increases as the lever height increases.

If the velocity of the brake lever 50 is less than 10.0% of its full travel or its movement range per second, the pressure current component is proportional to the difference between the front brake pressure and an expected pressure at the lever current. The expected pressure is linear with respect to lever current. The pressure current component shall be an integrated value as defined by the following equation: Pressure Current=Pressure Current+(Expected Pressure−Front brake pressure)×coefficient.

If the lever current component is non-zero, the front brake solenoid current shall be the algebraic sum of the lever current and pressure current components, otherwise, the front brake solenoid current shall become zero amps (except that the ECU 40 shall provide 100 mA for 0.5 seconds each 1000 seconds in order to determine if a solenoid circuit exists).

Upon determination of a failure condition, the ECU 40 transmits a warning signal, such as energizing an amber caution light, to the operator and provides current to the front brake solenoid valve 34 as follow. For a failure of the lever position sensor 52, the current level shall remain at the same level that was present prior to the failure. Subsequent current levels shall be controlled by the switch unit 54 and pressure sensed by sensor 48. For failures of switch unit 54, the current level shall remain proportional to the brake lever position and pressure sensed by sensor 48. For failures of front brake pressure sensor 48, the current level shall be proportional only to the position of lever 50. For failures of the solenoid of valve 34, the current level shall be zero.

The ECU 40 also performs the following service brake functions. Under normal conditions, the ECU 40 controls current to the front brake valve 34 in proportion to the left and right brake pedals 18, 20, rear brake pressure and front brake pressure. As both brake pedals 18, 20 are depressed and the rear brake pressure increases, a rear pressure current component (a current component associated with rear brake pressure) increases as does the lever current component.

As with the secondary brake function, the pressure current component is preferably proportional to the difference between the front brake pressure and the expected pressure (at the rear pressure current). The expected pressure is linear with respect to rear pressure current. The pressure current component shall be an integrated valve as set forth in the following equation: Pressure Current=Pressure Current+ (Expected Pressure−Front brake pressure)×coefficient.

If the rear pressure current is non-zero, the front brake solenoid current shall be the algebraic sum of the rear pressure current component and pressure current component. Otherwise, the front brake solenoid current shall become zero amps (except that the ECU 40 shall provide 100 milliamps for 0.5 seconds each 1000 seconds in order to determine if a solenoid circuit exists).

Upon determination of a failure condition, the ECU 40 transmits a warning signal to the operator and provides current to the front brake solenoid valve 34 as follows.

For failures of the front brake pressure sensor 48, the current level shall be proportional only to the rear pressure current. For a failure of the rear brake pressure sensor 42, and with both rear brake pedals 18, 20 not actuated, the current level shall be zero. For failures of the rear brake pressure sensor 42 and with both rear brake pedals 18, 20 actuated, the ECU generates a current level which is proportional to the speed sensed by vehicle speed sensor 56. For failures of the circuit including the solenoid of valve 34, the ECU 40 generates a zero current level.

Under normal conditions, the ECU 40 controls current to the solenoid of front brake solenoid valve 34 relative to the greater of the rear pressure current component and the lever current component.

Preferably, the lever 50 is calibrated to determine the lower and upper voltages corresponding to the travel of the lever 50. The front brake valve 34 is also calibrated to determine its deadband, or its threshold, where the valve 34 begins to open. A calibration process may also be used to verify operation of the brake lever 50, the front brake EH valve 34 and front and rear brake pressure sensors 48, 42.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle brake system, comprising:

a primary hydraulic pump;

secondary variable delivery pump;

left and right service brakes on the vehicle;

left and right service brake pedals;

a service brake valve connected between the primary pump and the service brakes, the service brake valve operating the service brakes in response to operation of the brake pedals;

left and right service brake switches generating signals representing operational status of the service brakes:

a secondary brake on the vehicle;

an electrohydraulic secondary brake valve, the secondary brake valve operating the secondary brake in response to an electronic control signal;

a service brake pressure sensor for generating a service brake pressure signal representing a pressure in the service brakes;

a secondary brake pressure sensor for generating a secondary brake pressure signal representing a pressure in the secondary brake; and an electronic control unit coupled to the service brake switches, to the pressure sensors and to the secondary brake valve, the control unit generating the control signal as a function of the status of the service brakes and of the brake pressure signals, the control unit and the secondary brake valve operating to apply the secondary brake when both left and right service brakes are applied.

2. The brake system of claim 1, wherein:

the secondary brake valve comprises a solenoid operated proportional pressure reducing valve.

3. The brake system of claim 1, further comprising:

a manually hand operated lever; and a lever position sensor which communicates a lever position signal to the ECU, the ECU generating the control signal as a function of the status of the service brakes, the brake pressure signals and the lever position signal.

4. The brake system of claim 1, further comprising:

a manually hand operated lever;

a lever position sensor which communicates a lever position signal to the ECU; and a lever engaged/disengaged status sensing unit which communicates a lever engaged/disengaged status signal to the ECU, the ECU generating the control signal as a function of the status of the service brakes, the brake pressure signals, the lever position signal and the lever engaged/disengaged status signal.

* * * * *